United States Patent [19]

Gambini et al.

[11] 3,964,171
[45] June 22, 1976

[54] DEVICE FOR STEPLESSLY DETECTING THE OVALIZATIONS AND THE PROJECTIONS ON TWO ORTHOGONAL PLANES OF THE CURVED GEOMETRICAL CONFIGURATION OF A SUBMERGED PIPELINE

[75] Inventors: Arnaldo Gambini; Demetrio Terenziani, both of San Donato Milanese, Italy

[73] Assignee: Snam Progetti S.p.A., Milan, Italy

[22] Filed: June 3, 1974

[21] Appl. No.: 475,924

[30] Foreign Application Priority Data

June 4, 1973 Italy .................................. 24986/73

[52] U.S. Cl. .................... 33/178 E; 33/178 F; 33/308; 33/313
[51] Int. Cl.² .................................. G01B 7/12
[58] Field of Search ............. 33/141 G, 178 F, 302, 33/304, 308, 309, 312, 313, 1 H, 129, 178 E, 174 L

[56] References Cited
UNITED STATES PATENTS

| | | |
|---|---|---|
| 2,030,244 | 2/1936 | Cox .................. 33/178 F |
| 2,317,632 | 4/1943 | Miller ................. 33/312 |
| 2,640,271 | 6/1953 | Boucher ............... 33/178 F X |
| 2,834,113 | 5/1958 | Dean et al. ........... 33/308 X |
| 3,571,937 | 3/1971 | Sears ................. 33/1 H X |
| 3,718,978 | 3/1973 | Van Koevering et al. .. 33/174 L |
| 3,753,296 | 8/1973 | Van Steenwyk ......... 33/304 |
| 3,769,711 | 11/1973 | Flournoy et al. ...... 33/141 G |
| 3,810,384 | 5/1974 | Evans ................. 73/67.8 S |

FOREIGN PATENTS OR APPLICATIONS 1,248,887   11/1960   France .................................. 33/304

*Primary Examiner*—Richard E. Aegerter
*Assistant Examiner*—Michael H. Thaler
*Attorney, Agent, or Firm*—Ralph M. Watson

[57] ABSTRACT

The present invention relates to a device for use in steplessly detecting the presence and the precise position of ovalizations, squashings or swellings into a submerged pipeline as well as the projections on a vertical plane and on a horizontal plane respectively of the curved geometrical configuration of said pipeline.

5 Claims, 3 Drawing Figures

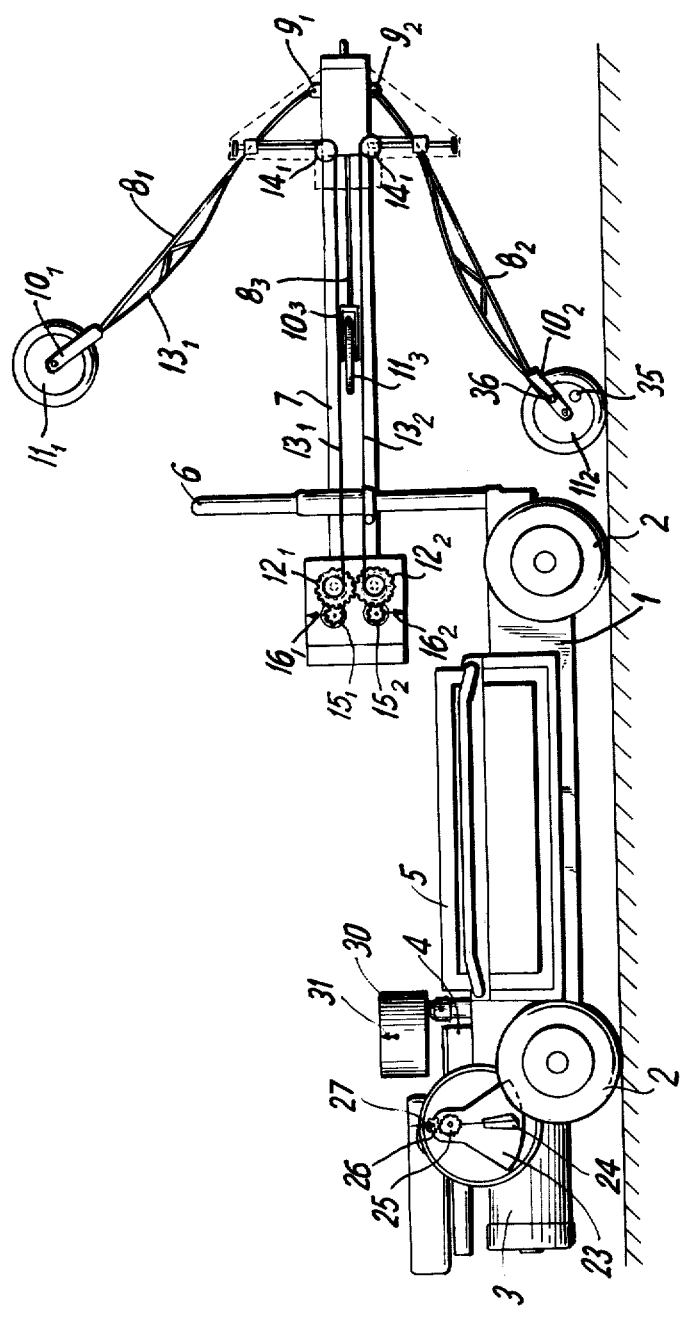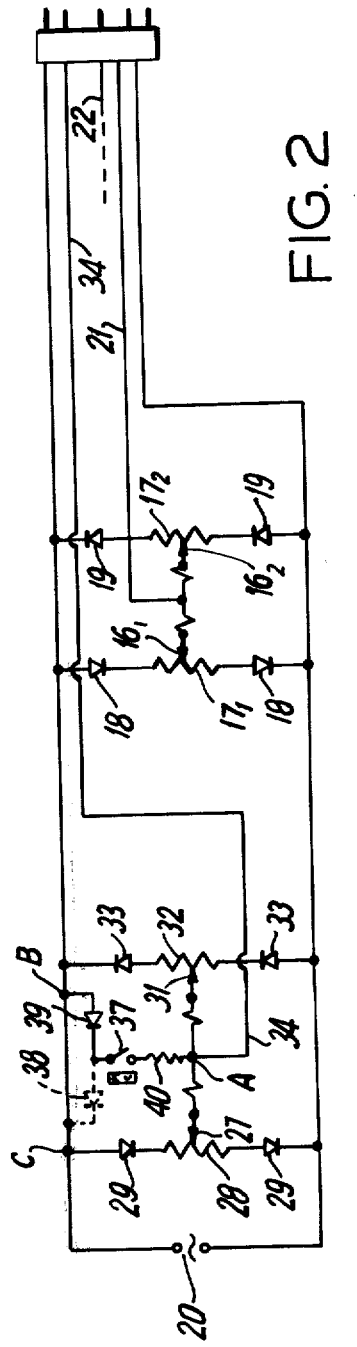

DEVICE FOR STEPLESSLY DETECTING THE OVALIZATIONS AND THE PROJECTIONS ON TWO ORTHOGONAL PLANES OF THE CURVED GEOMETRICAL CONFIGURATION OF A SUBMERGED PIPELINE

BACKGROUND AND SUMMARY OF THE INVENTION

As is well known, the laying of a pipeline in an underwater bed for conveying a gas or a liquid is carried out from a suitably equipped vessel. The pipeline portion comprised between said vessel and the submerged bed is always suspended and assumes in the space a curved geometrical configuration, the shape of which depends on a set of parameters such as diameter and thickness of the pipe, depth of the submerged bed, tractive force of the vessel, buoyancy of the same pipeline, etc. Now, it is very important to detect and to accurately determine during the laying operation the presence in the pipe of ovalizations and swellings so as to immediately stop the laying operation when these deformations exceed the prefixed tolerance limits, and the geometrical configuration of the pipeline, i.e. its curving, so as to avoid a squashing or breaking of the same pipeline by opportunely acting on the parameters putting the pipeline under tension when said curving tends to overcome the elastic strain limit for the said pipeline. On the other hand it should be kept in mind that the geometrical configuration of a pipeline is never contained in a plane, but in the space; said geometrical configuration is therefore wholly determined only when there are detected the projections of the same geometrical configuration on a vertical plane passing through the touching points between the pipeline and the vessel and the submerged bed respectively, and on a plane orthogonal to said vertical plane.

Some devices for use in detecting the geometrical configuration of a pipeline are already known by the prior art, but all these known devices, besides being expensive apparatus which work in a complicated and discontinuous way, interfere sometimes with the laying operations as they require the application and/or the recovery of transducers for detecting the geometrical configuration point by point, do not detect the geometrical configuration in the space, but only the projection of said geometrical configuration on a vertical plane, and furthermore do not detect the presence of incidental ovalizations or swellings.

An object of the present invention is to eliminate the above-said drawbacks and to provide a device allowing to steplessly detect in a simple and precise way both the deformations (ovalizations or swelling) of a submerged pipeline and the projections on two orthogonal planes of the geometrical configuration of said pipeline.

The device according to the invention comprises a selfpropelled carriage with four driving wheels, which is inserted and runs into a pipeline to be tested, said carriage being equipped with a system for feeling the inner surface of said pipeline so as to detect the geometrical shape of the pipe and hence whatever ovalizations or deformations which may be present, with a system sensitive to the slope of the carriage in a vertical plane and hence to the slope of the pipeline wherein the carriage runs, with a system sensitive to the shiftings in a horizontal plane of the carriage and hence of the pipeline wherein the carriage runs, and with a system for measuring the meters covered by the same carriage inside the pipeline.

According to an embodiment of the invention the said feeling system comprises a set of at least four feelers resiliently mounted, two by two opposed, on a head adjustable along the axis of the pipeline to be tested, each feeler being constituted by a lever backwardly inclined at a certain angle as to the running direction of the carriage, to the free end of each such lever there is pivotally mounted a small sliding and feeling wheel which is resiliently pressed against the inner surface of the pipeline, each said lever being connected by an inextensible wire to a first springloaded gear on which the said wire is wound and which meshes a second gear which is integral with the wiper of a potentiometer.

In such a way the shifting of any of the feelers owing to the presence of a swelling or deformation into the pipeline to be tested gives rise, through the inextensible wire, to a rotation of the said gears and hence of the wiper of the potentiometer so that a variable-resistance shifting transducer delivers an electric signal proportional to the value of said deformation.

According to a preferred embodiment of the invention the signals delivered by the transducers are sent via cable to the outside of the pipeline on the pipeline laying vessel where they are visualized or recorded by suitable instruments signaling in an acoustic way and/or by means of warning lights when the deformations exceed the prefixed tolerance limits so as to stop the running of the carriage.

According to another embodiment of the invention the said system sensitive to the slope in a vertical plane of the carriage and hence of the pipeline comprises a gravity inclinometer whose moving element is pivoted on a toothed pin meshing a small gear which is integral with the wiper of a potentiometer.

In such a way the variable-resistance transducer delivers a continuous voltage signal which is proportional to the second derivative of the line of the carriage and hence to the second derivative of the projection of the geometrical configuration of the pipeline on a vertical plane passing through the touching points between the pipeline and the submerged bed and the vessel respectively. According to another embodiment of the invention the said system sensitive to the shiftings in a horizontal plane of the carriage comprises a gyroscope acting in a known way on a variable-resistence transducer (potentiometer) so as to shift the moving wiper of the latter.

In such a way a continuous voltage signal is obtained which is proportional to the second derivative of the line representing the shiftings of the carriage in a projection of the geometrical configuration of the pipeline on a horizontal plane. Summing up, the said two continuous voltage signals allow the detection in a stepless way of the shape of the derivative of the geometrical configuration in the space of a pipeline and hence, practically, the shape of the same geometrical configuration.

According to another embodiment of the invention the said system for measuring the meters covered by the carriage inside the pipeline is constituted by a pulse tachometer comprising a contact switch which is mounted on one of the small sliding and feeling wheels of the feeling system and closes at every complete revolution of said wheel an electric circuit delivering a voltage pulse. According to a further embodiment of the invention the above-said voltage pulses delivered by the tachometer are added to the continuous signals delivered by the gravity inclinometer and by the gyroscope respectively and the two obtained addition signals are sent via cable on the vessel to the inlets of a two-pen recorder. In such a way in the recorder there are recorded two graphs illustrating the derivative of the projections of the geometrical configuration of the pipeline to be tested on a vertical plane and on a horizontal plane respectively, the meters covered by the carriage being marked on the same graphs; this allows the measuring of the value of the geometrical configuration at any point of the pipeline.

According to a preferred embodiment of the invention the carriage is equipped with an electromechanical or electronic counter for predetermining the number of meters of the pipeline in which there is an interest in detecting the geometrical configuration, so that the carriage is automatically stopped at the end of a detection, and with a timer for allowing the repetition at predetermined time intervals of the detection of the geometrical configuration by letting the carriage come back.

The invention will be now illustrated in the accompanying drawings which are merely exemplary and non-limiting embodiment, in that the adoption of constructional techniques or equivalent members different from those suggested herein lies within the scope of the present invention.

In said drawings:

FIG. 1 shows a schematic side view of the device according to the invention;

FIG. 2 shows schematically the wiring diagram of the circuit of FIG. 1.

Figure 3:
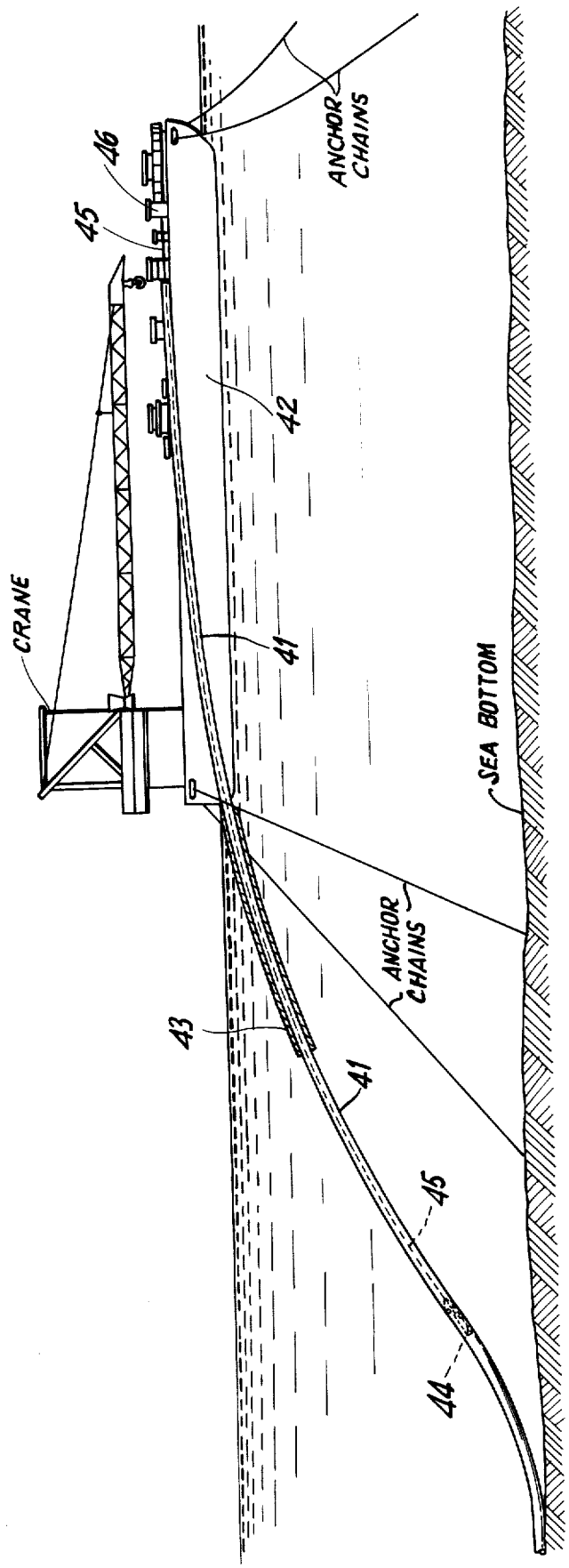
FIG. 3 shows a side view of a device of the invention and its operation in conjunction with a pipelaying vessel, pipe and pipelaying equipment.

Referring to FIGS. 1 and 2, reference numeral 1 indicates a self-propelled carriage mounted on four driving wheels, 2, moved in the two running directions by a D.C. gearmotor 3 which is operated by the electronic controlling unit 4. A battery 5 is located in the middle zone of the carriage and acts as an additional energy source for letting the carriage come out from the pipeline in the case of a breakdown of the apparatus or of a breakage of the coaxial feeding cable. A vertical stirrup 6 is rigidly fixed on the front part of the carriage and acts as a guide for a sliding head 7 which, in such a way, may be always positioned in correspondence with the axis of the pipeline to be tested. On head 7 there are resiliently mounted opposed pairs of feelers, each of which is constituted by a lever 8 backwardly inclined as to the running direction of the carriage, each said lever being pivotally connected at point 9 to the said head and resiliently pressed with its free end 10 against the inner surface of the pipeline to be tested.

In order to minimize the wear and the friction of the feelers and to easily overcome the eventual roughnesses or swellings which may be present inside the pipeline, a small sliding and feeling wheel 11 made of a hard, heat-resisting material able to pass without damage through the welded joints of the pipeline, is pivotally mounted on each free end 10 of levers 8.

In order to have a good probability that incidental deformations of the pipeline may be detected with certainty, at least four feelers are necessary (as in FIG. 1 where three feelers $8_1$, $8_2$, and $8_3$ are visible, the fourth feeler being opposed to $8_3$), but it is evident that the higher the number of the utilized feelers is, the better the detecting power of the device will be. Each of the free ends 10 of said levers 8 are connected to a spring-loaded gear 12 by means of an inextensible wire 13 which is guided by pulleys $14_1$ and wound around the hub of said gear 12. Gear 12 is then meshed with a second gear 15 which is integral with wiper 16 of a potentiometer. The potentiometers, e.g. $17_1$ and $17_2$, which are connected to two opposed feelers, e.g. $8_1$ and $8_2$ (in FIGS. 1 and 2 the shifting transducers are not shown, i.e. gears, inestensible wires and potentiometers, which are relevant to feelers $8_3$ and $8_4$, but said transducers are like the ones associated with feelers $8_1$ and $8_2$) are fed according to the present invention, through the pairs of diodes 18 and 19 respectively which are oriented in opposite directions, by the opposed half waves respectively of an A.C. feeding voltage 20 which is supplied to the carriage via cable from the pipeline laying vessel. This solution allows the sending to the laying vessel of the indications of two feelers $8_1$ and $8_2$ by means of a single conductor 21, so that the electric signals due to the four feelers may be transmitted by means of only two conductors 21 and 22. The manner of operation is clear. When any of the feelers, whose feeling wheels are resiliently pressed against the inner surface of the pipeline, makes a shifting owing to the present in the pipeline of a swelling or deformation, the relevant inextensible wire causes the corresponding gears to rotate in one direction or in the opposite direction so that the wiper of the relevant potentiometer is shifted. The electric signals delivered by the said potentiometer are in this way varied, said signals being proportional to the amount of the shifting of the said feelers and hence to the value of the detected deformation.

The electric signals delivered by the four potentiometers are sent via cable, through the said two conductors 21 and 22, to the pipeline laying vessel where they are visualized or recorded by as many suitable instruments which signal, in an acoustic way and/or by means of warning lights when, the relevant detected deformation exceeds the prefixed tolerance limit, and send, via cable, to the carriage a signal stopping the motor of the same carriage. On the rear part of carriage 1 there is furthermore mounted an ordinary gravity inclinometer 23 which gives instant by instant the slope value in a vertical plane of the carriage and hence of the pipeline wherein the carriage runs. The moving element 24 of said inclinometer is pivoted on a toothed pin 25 meshing a small gear 26 which is integral with the wiper 27 of a potentiometer 28 fed, through diodes 29, by the positive half waves of the said A.C. feeding voltage 20. In such a way the said potentiometer delivers a continuous signal which is a function of the slope of the pipeline in a vertical plane which is more precisely proportional to the derivative of said slope. In such a way it is possible to detect in a stepless way the derivative of the projection of the geometrical configuration of the pipeline on a vertical plane passing through the touching points between the pipeline and the submerged bed and the laying vessel respectively.

On the rear part of carriage 1 there is also mounted a gyroscope for 30 detecting the shiftings in a horizontal plane of the carriage and hence of the pipeline wherein the carriage runs. Said gyroscope acts on wiper 31 of a potentiometer 32 which is fed, through diodes 33 oriented in an opposite direction as to the said diodes 29, by the negative half waves of the said A.C. feeding voltage 20.

The continuous voltage signal delivered by potentiometer 32 is hence a function of the said shiftings and more precisely it is proportional to the derivative of the projection on a horizontal plane of the geometrical configuration of the pipeline. On the other hand, since potentiometers 28 and 32 are fed by opposed half waves, the signals of said potentiometers may be sent via cable on the pipeline laying vessel by means of a single conductor 34.

On one of the said small sliding and feeling wheels, e.g. wheel $11_2$, there may be a contact button 35 associated with a similar contact button 36 correspondingly mounted on lever $8_2$. A contact switch 37 (see FIG. 2) at every complete revolution of small wheel $11_2$, what corresponds to a certain number of meters covered by the carriage inside the pipeline, closes the electric circuit comprising diodes 38 and 39 and a resistance 40, said circuit being shunted between feeding source 20 and a common node A of wipers 27 and 31. In such a way, at every closing of switch 37 to the continuous signal delivered by potentiometer 28 there is added the voltage pulse existing between points B and A and to the continuous signal delivered by potentiometer 32 there is added the voltage pulse existing between points C and A.

In other words, the continuous signals proportional to the derivatives of the projections of the geometrical configuration of the pipeline on a vertical plane and on a horizontal plane respectively are marked by voltage peaks indicating the meters covered by the carriage.

The two signals of potentiometers 28 and 32, which are marked by pulses delivered by the above-described pulse tachometer, are then transmitted via cable, through conductor 34, to the laying vessel where said signals are sent to the inlets of a two-pen recorder which graphically visualizes in such a way the continuous shapes of the derivatives of the projections on a vertical plane and on a horizontal plane of the geometrical configuration of the pipeline to be tested, the meters covered by the carriage being marked on the same graphs, and thereby allows the measurement of the value of the geometrical configuration at any point of the pipeline.

In the electronic controlling unit 4 there are, finally, an electromechanical or electronic counter for predetermining the number of meters of the pipeline in which there is an interest in detecting the geometrical configuration (said counter automatically stops the carriage at the end of a detection) and a timer allows the repetition at predetermined time intervals of the said detection by letting the carriage come back.

Referring now to FIG. 3 which illustrates how the present invention may be used in an undersea pipe laying operation, pipe 41 is lowered into the sea from the pipe-laying vessel via ramp 43. The carriage for steplessly detecting pipe deformations, 44, travels along the interior of the pipe, inspecting it for ovalizations, squashings, swellings and other deformations. The carriage while it is carrying out its inspections is connected to recording/warning station 46 (e.g. two-pen recorder and signaling instruments) on the vessel by cables 45. Signals from the carriage are sent via the cable to the recording/warning station on the pipe laying vessel where the inspection may be visually monitored.

It is now evident that what is illustrated and described is only an exemplary and non-limiting embodiment, since all the variants known by anyone skilled in the art lie within the scope of the invention. Thus, e.g., for converting into electric signals the indications of the feelers, of the inclinometer and of the gyroscope, instead of variable-resistance transducers, use may be made of other types of transducers such as capacitive transducers, differential transformer trasducers, optic transducers etc.

By means of a simple electromechanical or electronic computer suitable to carry out the integration of derivative functions, it is possible to record the real shape of the projections on a vertical plane and on a horizontal plane of the geometrical configuration of a pipeline, instead of the derivatives of said projections, and finally the recorders may be located on the same carriage so that the connection via cable to the pipeline laying vessel may be eliminated.

It is preferred that the carriage be connected via cable to recorders on the pipe laying vessel. One reason for this the fact that the amount of a deformation, squashing or swelling has to be immediately detected in order to stop or modify the laying operation if necessary (i.e. to adjust the laying operation promptly based upon parameters that include tensions on the pipeline so that the pipeline will not break or become undesirably deformed). A further reason is the fact that a carriage transmitting the data via cable has the possibility to be fed from the outside of the pipeline and it may hence work without a break for a practically unlimited time, while its battery may be used in case of emergency, as said battery remains always charged.

What is claimed is:

1. Apparatus for steplessly detecting the ovalizations and the projections on two orthogonal planes of the curved geometrical configuration of a pipeline being laid underwater comprising: a self-propelled carriage adapted to run within a pipeline, said carriage having mounted on it driving wheels and means for detecting deformations on the inner surface of said pipeline, means for measuring the distance covered by the carriage in the pipeline, means for sensing the slope in a vertical plane of the pipeline, and means for sensing the shiftings in a horizontal plane of the pipeline wherein:

a. said means for feeling the inner surface of said pipeline comprises a set of at least four feelers resiliently mounted, two by two opposed, on a head vertically adjustable, each feeler being constituted by a lever backwardly inclined as to the running direction of the carriage, to the free end of which there is pivotally mounted a small sliding and feeling wheel which is adapted to be resiliently pressed against the inner surface of the pipeline, the said lever being connected by an inextensible wire to a first spring-loaded gear on which the said wire is wound and which meshes a second gear which is integral with the wiper of a potentiometer;

b. said means for sensing the slope in a vertical plane of the pipeline comprises a gravity inclinometer for sensing the slope in a vertical plane of the carriage which comprises a moving element pivoted on a tooth pin meshing a gear which is integral with the wiper of a potentiometer;

c. said means for sensing the shiftings in a horizontal plane of the pipeline comprises a gyroscope; and d. said means for measuring the distance covered by the carriage inside the pipeline comprises a pulse tachometer including contact switch which is mounted on one of the small sliding and feeling wheels and which closes at every complete revolution of said one small sliding and feeling wheel, an electric circuit thereby delivering a voltage pulse, said circuit comprising two diodes connected in parallel, oriented in opposite directions, and which at their turn are connected in series to a resistance.

2. Apparatus as claimed in claim 1 wherein: the said potentiometers of the means for sensing the slope in a vertical plane of the pipeline and of the means for sensing the shiftings in a horizontal plane of the pipeline respectively are fed, through pairs of diodes oriented in opposite directions, by the positive half-waves and by the negative half-waves respectively of an alternating current feeding source.

3. Apparatus as claimed in claim 2 wherein: the said sensing means potentiometers are connected to two opposed feelers of the means for feeling the inner surface of the pipeline and are fed, through pairs of diodes oriented in opposite directions, by the positive half-waves and by the negative half-waves respectively of the alternating current feeding source.

4. Apparatus as claimed in claim 3 wherein: the said electric circuit for delivering a voltage pulse is shunted between a branch of the said alternating current feeding source and the common outlet of the two potentiometers of the means for sensing the slope of the pipeline and of the means for sensing the shiftings in a horizontal plane of the pipeline respectively.

5. Apparatus as claimed in claim 4 wherein: the output signals of the said two potentiometers of the means for sensing the slope of the pipeline and of the means for sensing the shiftings in a horizontal plane of the pipeline, and the output signals of the said distance measuring means are sent via cable to the inlets of a two-pen recorder on the pipeline laying vessel.

* * * * *